United States Patent Office 2,903,848
Patented Sept. 15, 1959

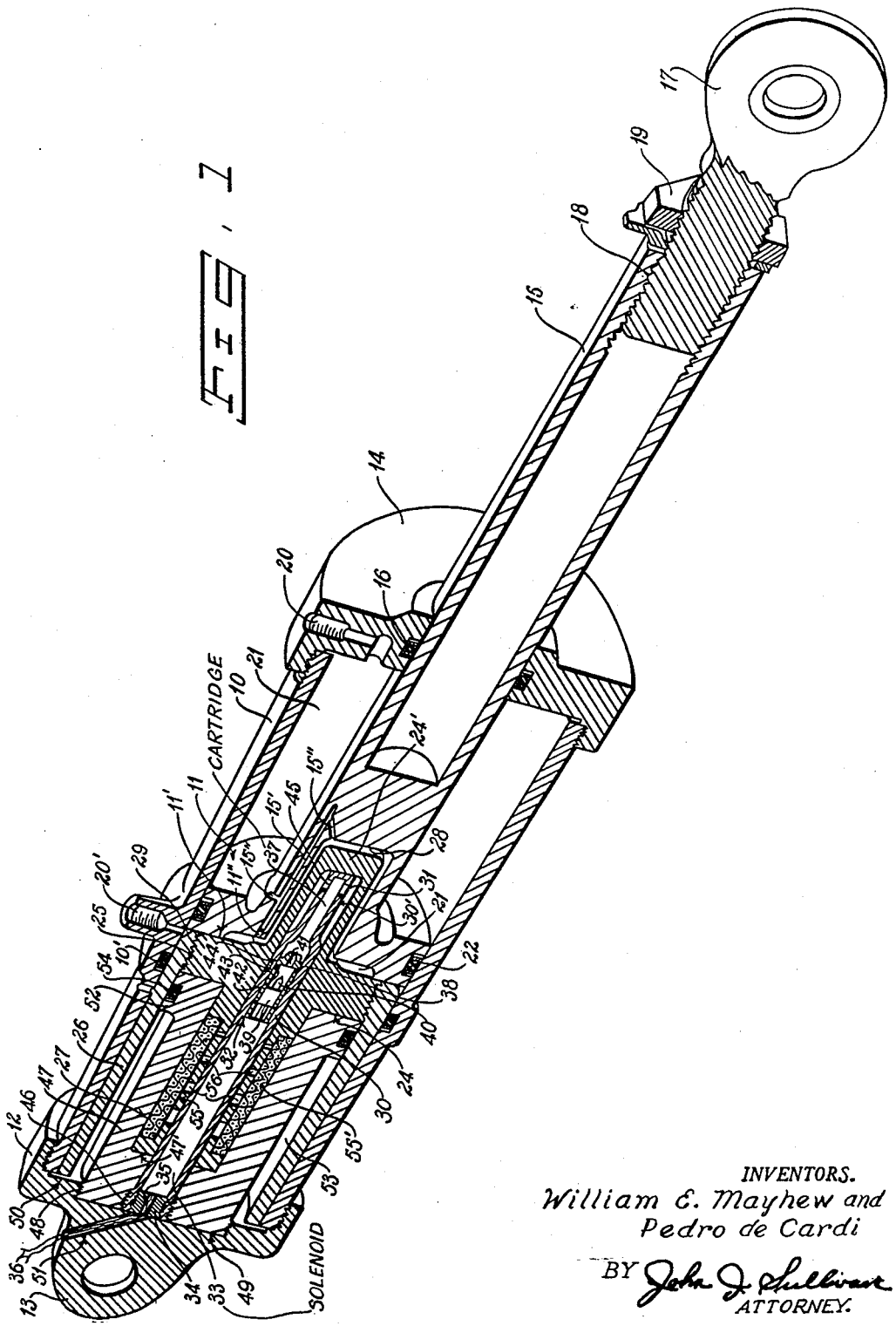

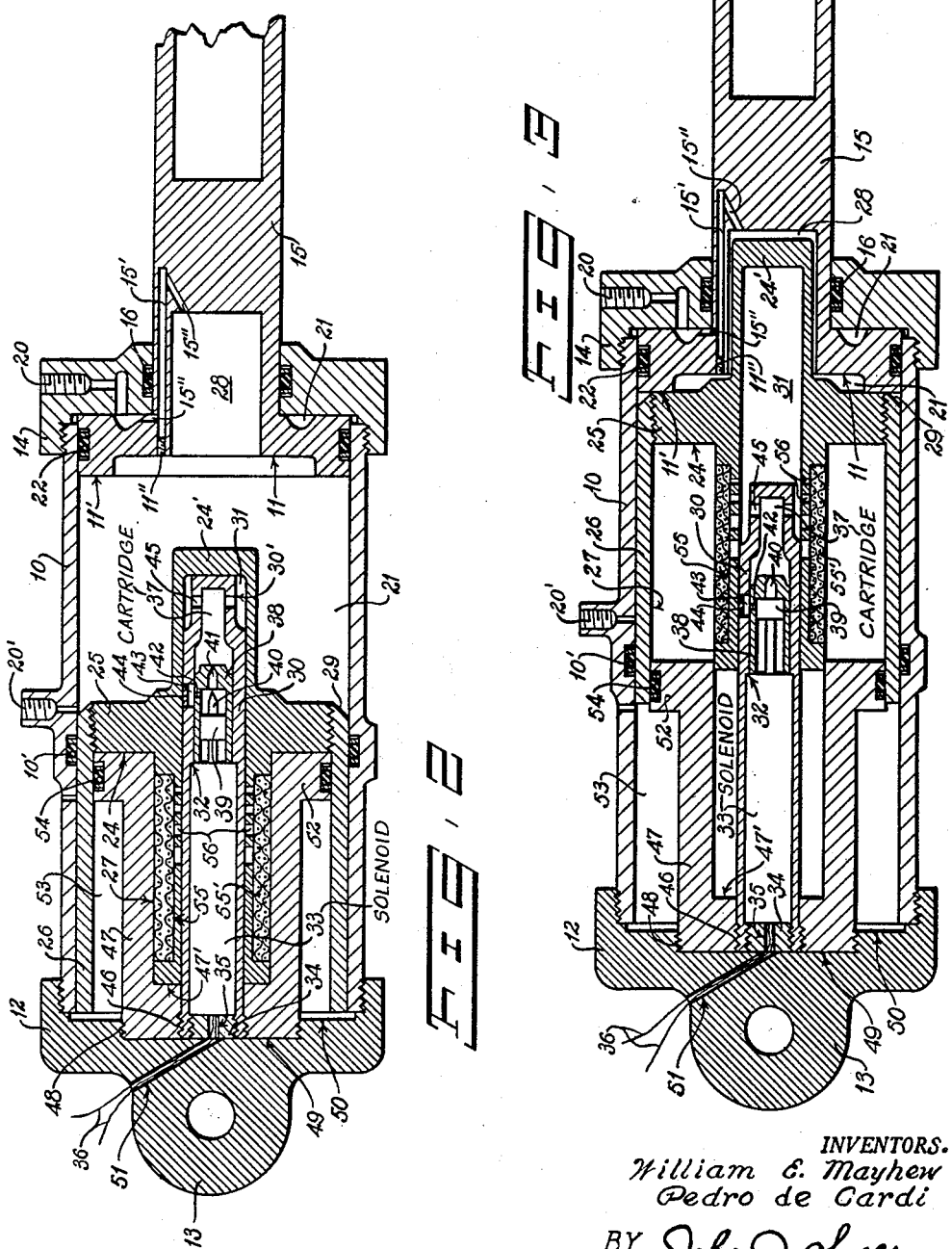

2,903,848

SELF-CONTAINED EMERGENCY FLUID CYLINDER

William E. Mayhew, Huntington, and Pedro de Cardi, South Farmingdale, N.Y., assignors to Republic Aviation Corporation, near Farmingdale, N.Y., a corporation of Delaware Application December 5, 1956, Serial No. 626,338

8 Claims. (Cl. 60—14)

This invention relates generally to power cylinders including the piston and its rod and more particularly to a fluid-operated power cylinder incorporating independent means for the emergency actuation thereof.

More specifically the present invention contemplates a power cylinder designed and adapted for normal extension and retraction and which includes an integral or built-in device by which the cylinder may be independently actuated in case of an emergency, for example a failure in the normal operating system.

Among other things, in the instant invention the emergency device is completely isolated from the operating fluid to thereby prevent contamination of the fluid during both normal and emergency operations. At the same time it proposes a power cylinder wherein the operating fluid is constantly circulated over and around the emergency device for cooling purposes.

In addition, the design, construction and assembly of the present power cylinder is such that installation, removal and replacement of the parts of the emergency device and especially the actuating unit thereof may be readily accomplished.

With the above and other objects in view, as will be apparent, this invention consists in the construction, combination and arrangement of parts all as hereinafter more fully described, claimed and illustrated in the accompanying drawings, wherein:

Fig. 1 is a longitudinal section in perspective taken through the present power cylinder disposed in the fully retracted position independently of the emergency device;

Fig. 2 is a longitudinal section of the power cylinder in the fully extended position to show, when considered in conjunction with Fig. 1, the normal operation thereof, the outer end of the piston rod having been broken off; and Fig. 3 is a section like Fig. 2 to show the actuation of the cylinder by the emergency device.

The present power cylinder, while designed for general application, finds particular utility in connection with aircraft for the control and operation of retractable landing gears, flaps, elevators, etc. In such applications it is necessary, upon a failure in the normal fluid operating system for the power cylinder to dispose the controlled member in a predetermined position, for example, the landing gears or flaps down during landing of the airplane.

Heretofore, alternate or over-ride systems have been employed consisting of a substantially duplicate system designed to stand by idly until called upon in an emergency. Thus, in addition to increased weight these prior emergency alternate systems require space which is not always available or easily provided. Moreover, the additional lines, valves, fluid accumulators, etc., incidental to these emergency systems are equally as prone to failure as the main or normal operating system, especially in military aircraft subjected to gun fire.

In addition, operating fluids are employed in many prior emergency systems which are not compatible with the fluid of the normal operating system. Thus, when such emergency systems are operated, substantial overhauling of the normal system is required to restore it to service.

Explosive cartridges or squibs have been used to operate the power cylinder of the normal hydraulic system. These devices have proven unsatisfactory and even dangerous due to premature and unintentional firing as a result of relatively high ambient temperatures in the area of their employment. Also where such explosive cartridges or squibs are employed for operating the power cylinder the large amount of gas resulting from the explosion enters into the hydraulic system and contaminates not only the fluid but the entire system. This requires draining and replacing all of the fluid and thorough cleaning of the system.

The present power cylinder proposes, among other things, to overcome all of the foregoing objections. To that end this cylinder comprises, in effect, a standard fluid power cylinder containing a secondary or supplemental chamber completely independent of and isolated from the main chambers on opposite sides of the piston in which the normal operating fluid under pressure is confined or circulates. This supplemental chamber accommodates the emergency actuating device which is normally held in a fixed or immovable position by the action of the normal operating fluid in the main chambers of the cylinder. Additional means is provided to cause the constant, controlled circulation of the normal operating fluid through the lines between the reservoir and the main chambers on opposite sides of the piston and over the exterior of the emergency device to prevent such a rise in its temperature that might cause the premature operation thereof.

When the emergency device is actuated it moves from its fixed position at one end of the cylinder against the holding action of the operating fluid on opposite sides of the piston in the main chamber to the opposite extremity of the cylinder. In so moving it drives the piston ahead of it and the operating fluid from the main chambers of the cylinder through the ports in communication with opposite sides of the piston.

Referring more particularly to the drawings, 10 designates the cylinder of the present device in which a piston 11 is mounted for reciprocation. At one of its ends the cylinder 10 is closed by a cap 12 threadably mounted thereon and having a projecting ear or lug 13 by which it is connected to fixed structure. At its opposite end the cylinder 10 is also closed by a cap 14 threadably mounted thereon. The cap 14 is pierced centrally by an aperture for the passage therethrough of a piston rod 15 carried by and extending from the piston 11. An O-ring seal or its equivalent 16 is provided in the edge of the cap 14 defining the aperture for sealing contact with the surface of the piston rod 15.

At its outer end the piston rod 15 carries a fitting or eye 17 by means of which it may be connected to a movable or controlled member (not shown). This fitting 17 may be threaded into or otherwise secured to the outer end of the piston rod 15, as at 18, and held against retrograde movement by any suitable means, such as a lock nut 19.

The cylinder 10 is provided with a pair of ports 20 and 20' each adapted to receive and connect a line or tube for hydraulic fluid delivered from a remote source or reservoir. Each of the ports 20 communicates with the interior of the cylinder 10 whereby the hydraulic fluid is delivered through them to and from the opposite sides of the piston 11. A pair of chambers 21 is created by and on opposed sides of the piston 11 and the ports 20, being situated on opposite sides of the piston 11 respectively, communicate with one of such chambers. The piston head 11' is provided with a peripheral seal 22 to prevent the passage of fluid between the chambers 21 around the edge of the head.

The retraction or telescoping of the piston 11 inwardly of the cylinder 10 is limited by a secondary or supplementary piston 24 seated within the cylinder between the cap 12 and the adjacent face 11' of the piston 11. The secondary piston 24 comprises a hollow cylindrical member of smaller diameter than that of the cylinder and the piston 11 closed at one end by an integral wall 24'. Medially of its length, the piston 24 is formed with an outstanding collar 25 of greater diameter than the cylindrical member, the outer edge of which is threaded to engage and mount the internally threaded end of a sleeve 26 which thereby forms, in effect, an integral part of the piston 24. An annular space 27 is thus created between the inner surface of the sleeve 26, the outer surface of the cylindrical member of the piston 24 and the associated face of the collar 25. The external diameter of the sleeve 26 is substantially equal to the internal diameter of the cylinder 10 whereby their surfaces abut and the sleeve 26 as well as the entire piston 24 is reciprocable in the cylinder 10. At least one O-ring 10' is seated in a complementary groove formed in the inner surface of the cylinder 10 to operate against the associated surface of the sleeve 26.

The open end of the cylindrical member of the secondary piston 24 terminates inwardly of the associated end of the sleeve 26. The length of the sleeve 26 is such that when the piston 11 is disposed in its fully retracted position within the cylinder 10, i.e., when the inner face 11' of the piston 11 abuts the adjacent face of the collar 25 the outer end of the sleeve 26 adjoins the inner face of the cap 12.

A cavity 28 is formed centrally in the piston 11 and the rod 15 to receive and accommodate the entire length of the projecting closed end-portion of the cylindrical member of the piston 24, and at that time the end wall 24' of such member is spaced from the base wall of the cavity 28. When the secondary piston 24 is thus disposed, the face of the collar 25 and the abutting face 11' of the piston 11 are located adjacent the port 20' then operative to exhaust fluid from the cylinder 10. The end of the sleeve 26 in approximate alignment with the working face of the collar 25 has the bevel or chamfer 29 to prevent the closing of the port 20'. When it is desired to convert the port 20' from an exhaust port to a feeding port, fluid passing through this port 20' will enter the space defined by the bevel 29 and act on and against the outer face of the collar 25 of the piston 24 and the adjacent face 11' of the piston head 11 to cause them to separate.

In order to prevent the accumulation of stagnant fluid within the chambers 21, as well as for other reasons to become more apparent, means is provided for the circulation of a limited amount of fluid through the piston 11 at all times and in every position in its adjustment. This is accomplished by means of a relatively small duct 15' which pierces the piston 11 near its center and extends longitudinally of the piston rod 15 adjacent to and coextensive with the cavity 28. Adjacent its ends the duct 15' is in open communication with opposite chambers 21 by means of and through inter-connecting ducts 15" passing substantially transversely through the rod 15. One of these ducts 15" connects one end of duct 15' with the cavity 28 which in turn communicates through the piston 11 with one of the chambers 21 while the other duct 15" connects the duct 15' directly with the other or opposite chambers 21. The outer end of the duct 15' is closed by a suitable plug 11" to insure the flow of all of the fluid passing between the opposed chambers 21 and through the piston 11 into and through the cavity 28.

A fixed cylindrical casing 30 is adapted to be inserted into the cylindrical member of the secondary piston 24. To this end, the casing 30 is substantially equal in length and diameter to the interior of the piston 24 to substantially fill it and form a core disposed in the axial center thereof. At its inner end, the casing 30 is tapered or of reduced diameter, as at 30', and terminates in a closed end which normally abuts the integral wall 24' of the piston 24 when the latter is passive. An annular chamber 31 is thereby created internally of the piston 24 around the inner end or nose 30' of the casing 30.

Adjacent its opposed or outer end, the casing 30 is formed with a greater internal diameter than that at its inner end whereby a shoulder 32 is formed. This shoulder receives and seats the inner end of an electrical actuator, such as a conventional solenoid 33 which is immovably held between the shoulder 32 and a closure plug 34 which is threaded into the open end of the casing 30. This plug or cap 34 is pierced centrally by an aperture 35 for the passage of the lead wires 36 from a suitable electric source for energizing the actuator or solenoid 33.

In the inner, closed end or nose 30' of the casing 30, an explosive cartridge or squib 37 is disposed. This squib 37 conforms in contour to the inner surface of the casing 30 so as to be matingly received therein to be held by a spacing cup 38 interposed between the inner end of the solenoid 33 and the outer end or head of the squib 37. The internal surface of the cup 38 is adapted to receive for reciprocation a bearing 39 to which is attached a firing pin 40, carried by and projecting from the solenoid 33. At one end, the firing pin 40 is mounted on and secured to the solenoid 33 for reciprocation by it within the cup 38 in response to actuation of the solenoid.

The bottom or closed end of the cup 38 is pierced by an aperture 41 aligned with the firing pin 40 through which the pin is projected by actuation of the solenoid 33. Thus, the firing pin 40 is projected through the aperture 41, being guided in its movement by the bearing 39 and the internal surface of the cup 38. The head of the pin 40 is thereby driven through the aperture 41 in the cup 38 to detonate or fire the squib 37, after which the head of the pin 40 fills and closes the aperture 41 for reasons to become hereinafter more apparent.

In order to permit the unrestricted movement of the pin 40 in the above manner, the enclosed end of the cup 38 is relieved or exhausted of air by a vent hole 42 which pierces the wall of the cup. This vent hole 42 is in open communication at its outer end with an air chamber 43 created or produced in the adjacent wall of the casing 30. This chamber may be produced in any manner, such as, for example, by transversely drilling the wall of the casing 30 to create the hole 43 and then closing the outer end of this hole with a plug 44 threaded into the end of the hole. The outer face of said plug lies flush with and forms a smooth continuation of the outer surface of the casing 30.

Adjacent its inner end or nose 30', the casing 30 is pierced by at least two diametrically opposed openings 45 each of which is in open communication with the annular chamber 31 surrounding the nose of the casing 30 for the discharge of the gases resulting from detonation of the squib 37. These expanding gases, thus leaving the casing 30, act on and against the inner face of the end wall 24' of the secondary piston 24, as will be explained.

At its outer end, the casing 30 terminates in external threads 46 for cooperation with complementary threads on a fixed sleeve 47 by and through which it is secured to the closure cap 12 of the cylinder 10. The casing 30 and the sleeve 47, when fully threaded together terminate with their ends in a common plane disposed beyond the end of the cylinder 10 and the sleeve 26 carried by the secondary piston 24. The portion of the fixed sleeve 47 disposed beyond the end of the cylinder 10 is externally threaded, as at 48, and the cap 12 is recessed centrally to create a socket 49 and a shoulder 50 between the edge of the cap defining said socket and the threaded flange of the cap engaging the threaded end of the cylinder 10. Thus, the threaded end 48 of the fixed sleeve 47 is received in the socket 49, the side wall of which is threaded for cooperation with the threads 48 to secure the fixed sleeve to the cap 12. When the cap 12 is disposed over and enclosing the end of the cylinder 10, wires 36 extending from the solenoid 33 pass through a bore 51 provided in and piercing the cap 12.

The internal diameter of the fixed sleeve 47 is enlarged from its inner end to create a shoulder 47' near its opposite end. The depth of this shoulder 47' is substantially equal to the thickness of the wall of the cylindrical member of the piston 24 disposed therein whereby the fixed sleeve 47 normally abuts the inner end and the external surface of that portion of the cylindrical member of the piston. At this time the end of the fixed sleeve 47 remote from the shoulder 47' abuts the associated face of the collar 25.

Adjacent its inner end the sleeve 47 is formed with an outer annular flange 52 which projects therefrom to abut the inner surface of the movable sleeve 26 thereby creating an annular space 53 between the adjacent surfaces of the sleeves 26 and 47 and the collar 52 and cap 12. An O-ring seal 54 is seated in a peripheral groove in the edge of the flange 52 to contact and sealingly engage the inner surface of the sleeve 26.

The portion of the cylindrical member of the piston 24 underlying the fixed sleeve 47 when the piston 24 is in its normal or passive position is circumferentially recessed or grooved, as at 55. The wall of the piston 24 constituting the bottom of the groove 55 is pierced by a plurality of spaced, diametrically opposed holes 56 of gradually increasing diameter toward the cap 12 of the cylinder 10. If desired or required, screening or filtering material 55' may be disposed within the groove or recess 55 to substantially fill it.

From the foregoing description of the present power cylinder, its operation should be readily understood. Under normal operating conditions fluid is directed to either of the ports 20 or 20' for the reciprocation of the piston 11 within the cylinder 10 to and from the protracted and retracted positions. At the same time, this fluid under pressure operative in the chambers 21 acts against the surface of the collar 25 and the wall 24' of the secondary piston 24 to retain it in a fixed inoperative position at one end of the cylinder 10 (Fig. 2). Fluid in the chambers 21 circulates through the ducts 15' and 15" and cavity 28 interconnecting opposite sides of the piston 11. Thus, the hydraulic fluid circulates from one side of the piston 11 to the other and around the projecting end 24' of the secondary piston 24 which, when such piston is inactive (as shown in Figs. 1 and 2), surrounds the nose of the casing 30 containing the squib or cartridge 37. This circulation maintains the casing 30 and squib or cartridge 37 at a safe temperature below the ambient temperature about the power cylinder and prevents any fluid from accumulating within the chambers 21.

When, for any reason, the hydraulic system fails to operate and it is desired to extend or project the rod 15 relative to the cylinder 10, the solenoid 33 is energized to actuate or trigger the firing pin 40 and explode the cartridge 37. The gases thereby released expand and pass through the holes 45 in the nose of the casing 30 into the chamber 31 where they operate against the wall 24' of the piston 24 to force it toward the cap 14 of the cylinder 10. This movement of the secondary piston 24 drives the piston 11 ahead of it for the extension of the piston rod 15.

At a predetermined point in this movement of the piston 24, i.e., when the apertures 56 in the wall of the cylindrical member of the secondary piston 24 clear or pass from a position overlying the surface of the casing 30, gases within the chamber 31 escape therethrough to operate against the inner face of the collar 25 of the secondary piston 24. Thus, the force of the expanding gases acts on and against an increased area or surface of the piston 24. Where filtering material 55' is employed in the groove 55, this will serve to strain the gases as they pass through the holes 56 in the wall of the piston 24 to prevent fragments of the cartridge 37 from entering the space 27 where they are isolated by the sleeve 26.

Upon operation of the emergency device in the above manner, the power cylinder is extended against the action of the operating fluid within the chambers 21 of the cylinder 10 for corresponding movement of the controlled member connected to the fitting 17 at the outer end of the rod 15. At the end of this extension, the gases are trapped in the space 27 between the sleeve 26 and the cylindrical member of the piston 24 to maintain the controlled member in its emergency position.

In order to reestablish normal operation of the power cylinder, the cap 12 is removed to vent or exhaust the gases from the space 27. The piston 11 may then be retracted to move the secondary piston 24 to its normal position. Closure plug 34 is then removed to permit access to the interior of the casing 30 for cleaning, insertion of a new carriage 37 and resetting of the solenoid 33. When the closure plug 34 and cap 12 are replaced, the power cylinder including the emergency device is ready for use as above described. This use and reuse may be repeated an unlimited number of times without admitting the gas from the cartridge 37 into the hydraulic system or losing any of the fluid thereof.

What is claimed is:

1. The combination with a fluid cylinder, a main piston therein and caps closing the ends thereof, of an emergency actuating device comprising a secondary piston having a hollow cylindrical member open at one end and closed at the other concentrically secured thereto and projecting on each side thereof, an explosive cartridge fixedly disposed within said cylindrical member adjacent the closed end thereof, and means carried by one of said caps and extending into and closing the open end of said cylindrical member for detonating said cartridge, said means being disposed in spaced relation with the closed end of the cylinder to define a chamber whereby the gases resulting from such explosion fill said chamber and operate against the closed end of said cylindrical member to move the secondary piston to the opposite end of the cylinder.

2. The combination with a hydraulic cylinder closed at its ends, of a piston mounted for reciprocation therein, fluid ports in the cylinder on opposite sides of said piston for delivering hydraulic fluid to opposite faces of the piston to reciprocate it in the cylinder, an explosive cartridge fixedly secured to one end of the cylinder and projecting therefrom toward the piston and terminating in an end of reduced cross-section, a hollow member overlying and enclosing said cartridge, said member having an internal diameter substantially equal to the diameter of the cartridge whereby an isolated chamber is created in the member adjacent the reduced end of the cartridge, a cavity provided in the piston in alignment with said cartridge for mating coaction therewith when the piston is disposed at that end of the cylinder by operation of the fluid as aforesaid, duct means interconnecting opposed sides of the piston and communicating with said cavity for the passage of fluid over and around said cartridge, and means for detonating the cartridge whereby the resulting gases fill the isolated chamber aforesaid and act on and against the member to force it and the piston to the opposite end of the cylinder.

3. The combination with a cylinder having a piston therein and means for delivering operating fluid to either face of said piston, of an emergency actuating device therefor comprising a partially hollow reciprocating member mounted within the cylinder on one side of the aforesaid means whereby said member is normally held in a fixed position within the cylinder by the action of the operating fluid on and against it, an explosive charge disposed at one end of the cylinder and projecting therefrom to be disposed within the hollow portion of said reciprocating member, a duct piercing the piston adjacent said hollow portion for the passage of a limited quantity of operating fluid to both sides of the piston in the area of the explosive charge, a detonator to fire the explosive charge, and passage means provided in the reciprocating member in communication with the explosive charge after detonation and that side of the reciprocating member in opposition to the operating fluid to direct the gases resulting from firing said charge against the reciprocating member to overcome the normal pressure of the operating fluid.

4. The combination with a hydraulic actuator having a cylinder and a piston therein, of an emergency actuating device comprising a reciprocating member having one face formed with different portions mounted within the cylinder and normally held in a fixed position adjacent one end thereof by the action of the hydraulic fluid within the cylinder on the opposite face of said member, a chamber within said reciprocating member, an explosive charge mounted within said chamber, a detonator for firing the explosive charge whereby the resulting gases expand within the chamber to act on a portion of said one face of the reciprocating member and thereby move it to the other end of the cylinder against the action of the hydraulic fluid, and a plurality of openings of different sizes in the wall of said chamber to emit such gases released by the detonation of said charge in increasing quantities as the reciprocating member moves to the other end of the cylinder to act on and against a different portion of said one face of the reciprocating member in opposition to said fluid.

5. The combination with a hydraulic actuator having a cylinder, a primary piston and fluid inlet ports in said cylinder on opposite sides of said piston, of an emergency operating device comprising a secondary piston having at least two operating faces and normally disposed within the cylinder on one side of both inlet ports whereby hydraulic fluid entering said ports and operating against said primary piston acts in opposition to said operating faces to thereby hold the secondary piston in a fixed position adjacent one end of the cylinder, an explosive charge disposed in said cylinder, a detonator for firing said charge, and passage means for directing the gases generated by the detonation of said charge against said operating surfaces in sequence to move the secondary piston out of its fixed position aforesaid against the pressure thereon by the hydraulic fluid.

6. The combination with a hydraulic actuator including a movable piston therein, of an emergency operating device therefore comprising a movable member having a face of different portions mounted within the actuator and normally held in a fixed position therein by the action of the hydraulic fluid within said actuator on the face thereof, an explosive charge mounted within said movable member, a duct internally of the actuator adjacent said explosive charge to conduct hydraulic fluid in the actuator around the explosive charge and thereby maintain it at temperatures below the firing point, a detonator to fire the explosive charge, passage means within the movable member to direct the gases generated by the firing of said charge against different portions of the face of said member in opposition to the hydraulic fluid to move said member out of its normally fixed portion aforesaid against the pressure of the hydraulic fluid acting against it, the piston being thereby driven ahead of the member, and an isolated chamber within said movable member communicating with said passage means to receive the gases generated by the detonation aforesaid and thereby prevent the contamination of the hydraulic fluid.

7. The combination with a fluid-actuated cylinder closed at its ends and having a primary piston mounted for reciprocation therein between a pair of fluid ports, of an emergency actuating device comprising a secondary, centrally hollow piston mounted within the cylinder to one side of said ports whereby fluid within the cylinder normally maintains said secondary piston in fixed position adjacent one end of the cylinder during reciprocation of the primary piston by the action of said fluid, a casing fixedly secured at one of its ends to one end of the cylinder with its other end closed and perforated and projecting into the hollow secondary piston, an explosive cartridge disposed in the closed and perforated end of the casing, a solenoid disposed within the casing adjoining the fixed end thereof, a spacing cup interposed between said cartridge and said solenoid with its base abutting the end of the cartridge and pierced centrally by an aperture whereby the solenoid, cup and cartridge are immovably disposed within said casing, a firing pin mounted for reciprocation centrally in the spacing cup and connected to the solenoid for operation thereby, said pin conforming in shape and size peripherally to the aperture in the base of the cup for mating reception therein, and means for energizing the solenoid whereby said pin detonates the cartridge and concurrently closes said aperture and the gases released by such detonation pass through the perforated end of the casing to act on and against the secondary piston for movement thereof in opposition to fluid to the other end of said cylinder.

8. A power cylinder comprising a primary piston having an axial cavity in one of its faces and mounted for reciprocation in the cylinder, a secondary piston mounted for reciprocation within the cylinder and having an axial, hollow, cylindrical member projecting beyond each face thereof, one end of said member being closed and telescoping with the cavity aforesaid and its opposite end being open, fluid inlets in the cylinder on opposite sides of the primary piston for the delivery of fluid thereto for the reciprocation of said primary piston in the cylinder, the secondary piston being concurrently held in a fixed position to one side of said fluid inlets and out of the path of reciprocation of the primary piston by the action of said fluid on and against its face, an explosive cartridge secured to the cylinder and disposed in the closed end of said cylindrical member, a duct interconnecting opposite sides of the primary piston for the passage of fluid therethrough, and means for firing the cartridge whereby the resulting gases move the secondary piston out of its normally fixed position in the cylinder against the action of the fluid to one end of the cylinder.

References Cited in the file of this patent

UNITED STATES PATENTS

| 1,186,023 | Moore | June 6, 1916 |
| 2,469,660 | Martin | May 10, 1949 |